US011012707B2

(12) United States Patent
Li et al.

(10) Patent No.: US 11,012,707 B2
(45) Date of Patent: May 18, 2021

(54) METHOD AND APPARATUS FOR VIDEO CODING

(71) Applicant: Tencent America LLC, Palo Alto, CA (US)

(72) Inventors: Xiang Li, Los Gatos, CA (US); Xiaozhong Xu, State College, PA (US); Shan Liu, San Jose, CA (US); Xin Zhao, San Diego, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/579,188

(22) Filed: Sep. 23, 2019

(65) Prior Publication Data
US 2020/0021843 A1 Jan. 16, 2020

Related U.S. Application Data

(63) Continuation of application No. 16/203,145, filed on Nov. 28, 2018, now Pat. No. 10,469,869.

(60) Provisional application No. 62/679,642, filed on Jun. 1, 2018.

(51) Int. Cl.
*H04N 19/56* (2014.01)
*H04N 19/577* (2014.01)
*H04N 19/159* (2014.01)
*H04N 19/52* (2014.01)

(52) U.S. Cl.
CPC ......... *H04N 19/56* (2014.11); *H04N 19/159* (2014.11); *H04N 19/52* (2014.11); *H04N 19/577* (2014.11)

(58) Field of Classification Search
None
See application file for complete search history.

(56) References Cited

U.S. PATENT DOCUMENTS

| 6,097,842 A | 8/2000 | Suzuki |
| 9,049,452 B2 | 6/2015 | Liu et al. |
| 9,510,012 B2 | 11/2016 | Liu et al. |
| 9,813,726 B2 | 11/2017 | Liu et al. |

(Continued)

OTHER PUBLICATIONS

High Efficiency Video Coding (HEVC), Rec. ITU-T H.265 and ISO/IEC 23008-2, Jan. 2013.

(Continued)

*Primary Examiner* — Peter D Le
(74) *Attorney, Agent, or Firm* — Oblon, McClelland, Maier & Neustadt, L.L.P.

(57) ABSTRACT

Aspects of the disclosure provide methods and apparatuses for video encoding/decoding. In some examples, an apparatus includes processing circuitry for video decoding. The processing circuitry decodes prediction information for a first block in a current picture from a coded video bitstream. The prediction information is indicative of an inter prediction mode that determines a first motion vector for the first block from a motion vector predictor. The processing circuitry then constructs, in responses to the inter prediction mode, a candidate list of candidate motion vector predictors with an exclusion from a second block that requires an operation to finalize a second motion vector for the second block in a motion vector derivation. Then, the processing circuitry determines, based on the candidate list, the first motion vector for the first block, and reconstructs the first block according to the first motion vector for the first block.

16 Claims, 16 Drawing Sheets

(56) References Cited

U.S. PATENT DOCUMENTS

| | | | |
|---|---|---|---|
| 10,432,962 B1* | 10/2019 | Liu | H04N 19/521 |
| 2002/0036705 A1 | 3/2002 | Lee | |
| 2004/0086047 A1 | 5/2004 | Kondo | |
| 2004/0233988 A1 | 11/2004 | Kadono | |
| 2005/0053293 A1 | 3/2005 | Lin | |
| 2010/0118969 A1 | 5/2010 | Kondo | |
| 2010/0239015 A1 | 9/2010 | Wang | |
| 2010/0284469 A1 | 11/2010 | Sato | |
| 2011/0080954 A1 | 4/2011 | Bossen | |
| 2011/0176611 A1 | 7/2011 | Huang | |
| 2012/0189062 A1 | 7/2012 | Sugio | |
| 2012/0230408 A1 | 9/2012 | Zhou | |
| 2012/0328015 A1 | 12/2012 | Kim | |
| 2013/0022119 A1 | 1/2013 | Chien | |
| 2013/0039426 A1* | 2/2013 | Helle | H04N 19/30 375/240.16 |
| 2013/0188720 A1 | 7/2013 | Wang | |
| 2013/0243093 A1 | 9/2013 | Chen | |
| 2013/0287108 A1 | 10/2013 | Chen | |
| 2014/0016701 A1 | 1/2014 | Chen | |
| 2014/0105302 A1 | 4/2014 | Takehara | |
| 2014/0219356 A1 | 8/2014 | Nishitani | |
| 2014/0269916 A1* | 9/2014 | Lim | H04N 19/13 375/240.15 |
| 2014/0286421 A1 | 9/2014 | Kang | |
| 2014/0301471 A1* | 10/2014 | Lin | H04N 19/463 375/240.16 |
| 2014/0321547 A1 | 10/2014 | Takehara | |
| 2015/0085930 A1 | 3/2015 | Zhang | |
| 2016/0173878 A1 | 6/2016 | Oh | |
| 2017/0332099 A1 | 11/2017 | Lee | |
| 2018/0241998 A1* | 8/2018 | Chen | H04N 19/124 |
| 2019/0110058 A1* | 4/2019 | Chien | H04N 19/523 |
| 2019/0208223 A1* | 7/2019 | Galpin | H04N 19/139 |

OTHER PUBLICATIONS

X. Li, J. Chen and M. Karczewicz, "Frame Rate Up-Conversion Based Motion Vector Derivation for Hybrid Video Coding," 2017 Data Compression Conference (DCC), Snowbird, UT, 2017, pp. 390-399.

Shan Liu, JongWon Kim and C.-C. Jay Kuo, "Hybrid global/local motion compensated frame interpolation for low bit rate video coding," the Journal of Visual Communication and Image Representation, vol. 14, pp. 61-79, Jun. 2003.

J. Chen, E. Alshina, G. J. Sullivan, J.-R. Ohm, J. Boyce, "Algorithm description of Joint Exploration Test Model 7 (JEM7)", JVET-G1001, Jul. 2017.

J. Ye, X. Li, S. Liu, "Merge mode modification on top of Tencent's software in response to CfP", JVET-J0058, San Diego, CA, Apr. 2018.

J. An, N. Zhang, X. Chen, J. Zheng, "Enhanced Merge Mode based on JEM7.0", JVET-J0059, San Diego, CA, Apr. 2018.

Shan Liu, JongWon Kim and C.-C. Jay Kuo, "Video Coding via Adaptive Selection of Generalized Motion Prediction Modes" in the Picture Coding Symposium 2001, Seoul, Korea, Apr. 25-27, 2001.

Shan Liu, JongWon Kim and C.-C. Jay Kuo, "MCI-embedded motion-compensated prediction for quality enhancement of frame interpolation" in Multimedia Systems and Applications III, vol. 4209, p. 251-262, Mar. 2001.

Shan Liu, JongWon Kim and C.-C. Jay Kuo, "Nonlinear motion-compensated interpolation for low-bit-rate video" in Applications of Digital Image Processing XXIII, vol. 4115, p. 203-214, 2000.

* cited by examiner

METHOD AND APPARATUS FOR VIDEO CODING

INCORPORATION BY REFERENCE

This application is a continuation of U.S. application Ser. No. 16/203,145 filed Nov. 28, 2018, which claims the benefit of priority to U.S. Provisional Application No. 62/679,642, "CONSTRAINT FOR DECODER SIDE MV DERIVATION AND REFINEMENT" filed on Jun. 1, 2018. The entire contents of the above-noted applications are incorporated herein by reference.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

SUMMARY

Aspects of the disclosure provide methods and apparatuses for video encoding/decoding. In some examples, an apparatus includes processing circuitry for video decoding. The processing circuitry decodes prediction information for a first block in a current picture from a coded video bitstream. The prediction information is indicative of an inter prediction mode that determines a first motion vector for the first block from a motion vector predictor. The processing circuitry then constructs, in responses to the inter prediction mode, a candidate list of candidate motion vector predictors with an exclusion from a second block that requires an operation to finalize a second motion vector for the second block in a motion vector derivation. Then, the processing circuitry determines, based on the candidate list of candidate motion vector predictors, the first motion vector for the first block, and reconstructs the first block according to the first motion vector for the first block.

In an embodiment, the processing circuitry marks a candidate motion vector predictor from the second block as unavailable when the second block is consecutively prior to the first block in a decoding order.

In another embodiment, the processing circuitry marks a candidate motion vector predictor from the second block as unavailable when the second block is in one of a merge mode and a skip mode and is consecutively prior to the first block in a decoding order.

In another embodiment, the processing circuitry marks a candidate motion vector predictor from the second block as unavailable when the second block is in a mode that uses decoder side motion vector derivation to determine the second motion vector for the second block, and the second block is consecutively prior to the first block in a decoding order.

In another embodiment, the processing circuitry marks a candidate motion vector predictor from the second block as unavailable when the second block is in a bi-lateral prediction mode and is consecutively prior to the first block in a decoding order.

In another embodiment, the processing circuitry marks a non-adjacent spatial motion vector predictor as unavailable when the non-adjacent spatial motion vector predictor belongs to the second block that is consecutively prior to the first block in a decoding order.

In another embodiment, the processing circuitry unmarks the candidate motion vector predictor from the second block when the first block and the second block belong to different coding tree units. In another embodiment, the processing circuitry unmarks the candidate motion vector predictor from the second block when the first block and the second block belong to different slices.

In another embodiment, the processing circuitry unmarks the candidate motion vector predictor from the second block when the first block and the second block belong to different tiles.

In some examples, the processing circuitry substitutes the candidate motion vector predictor from the second block with a motion vector predictor from a neighboring block of the second block.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
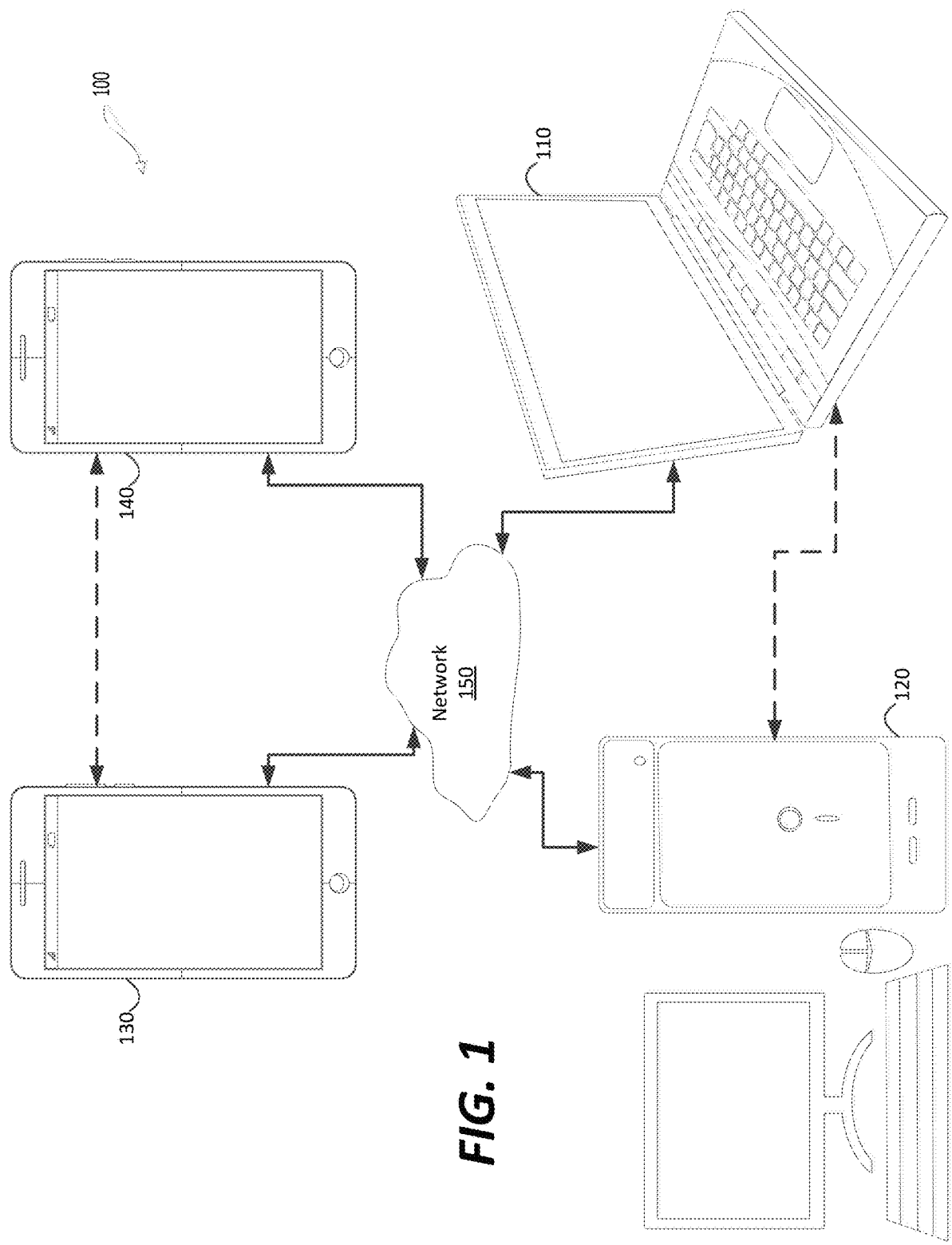
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
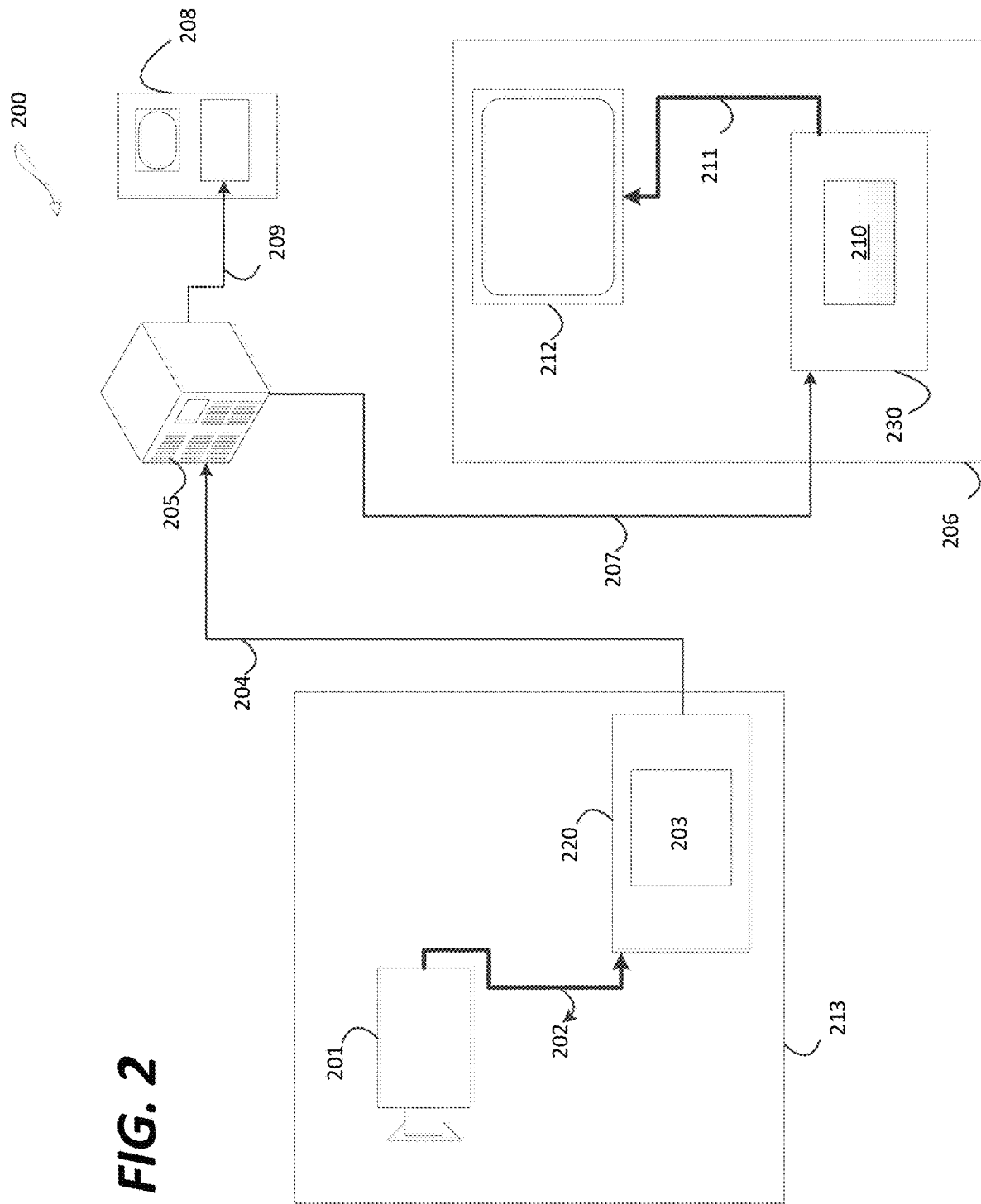
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
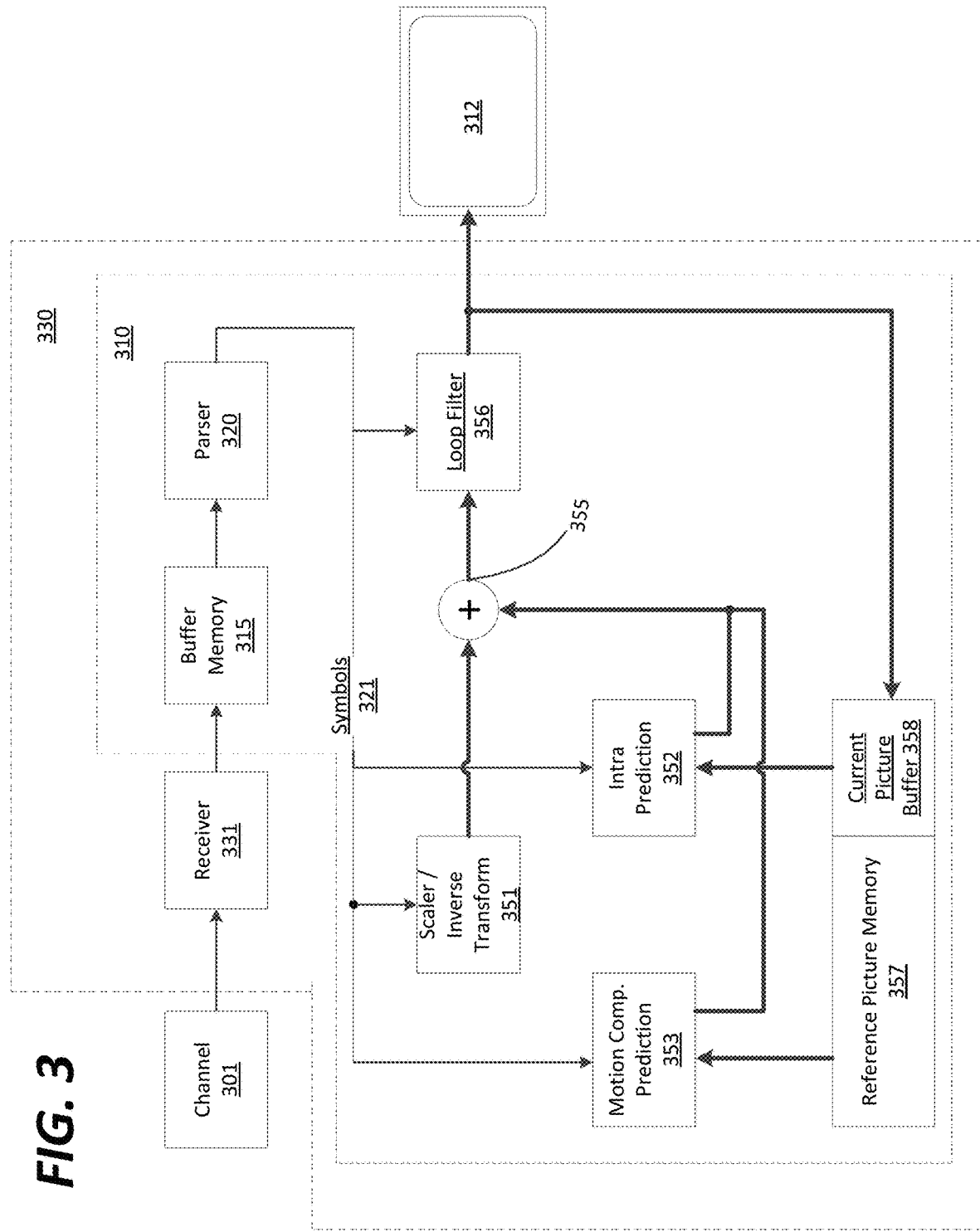
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
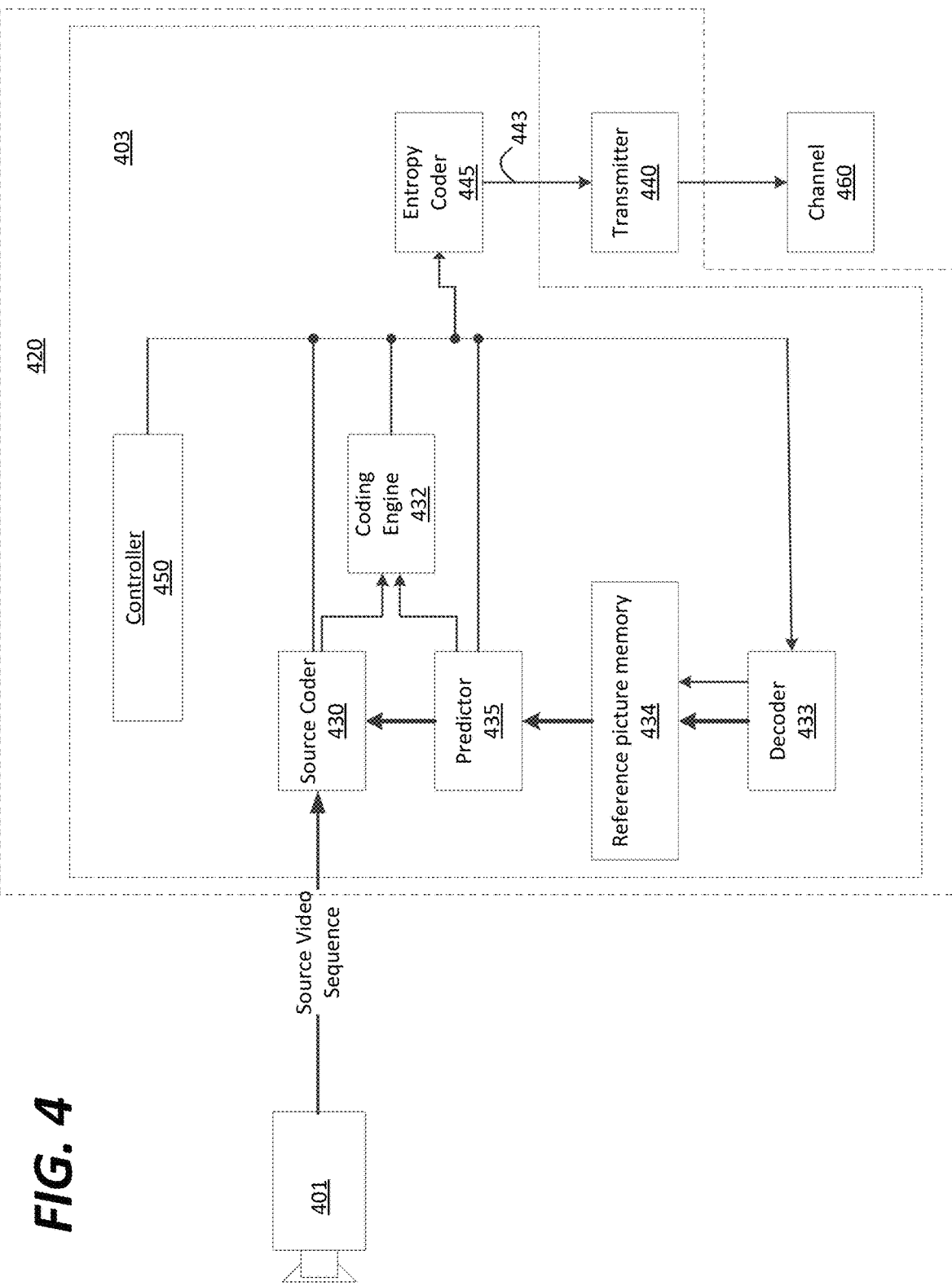
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by losslessly compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
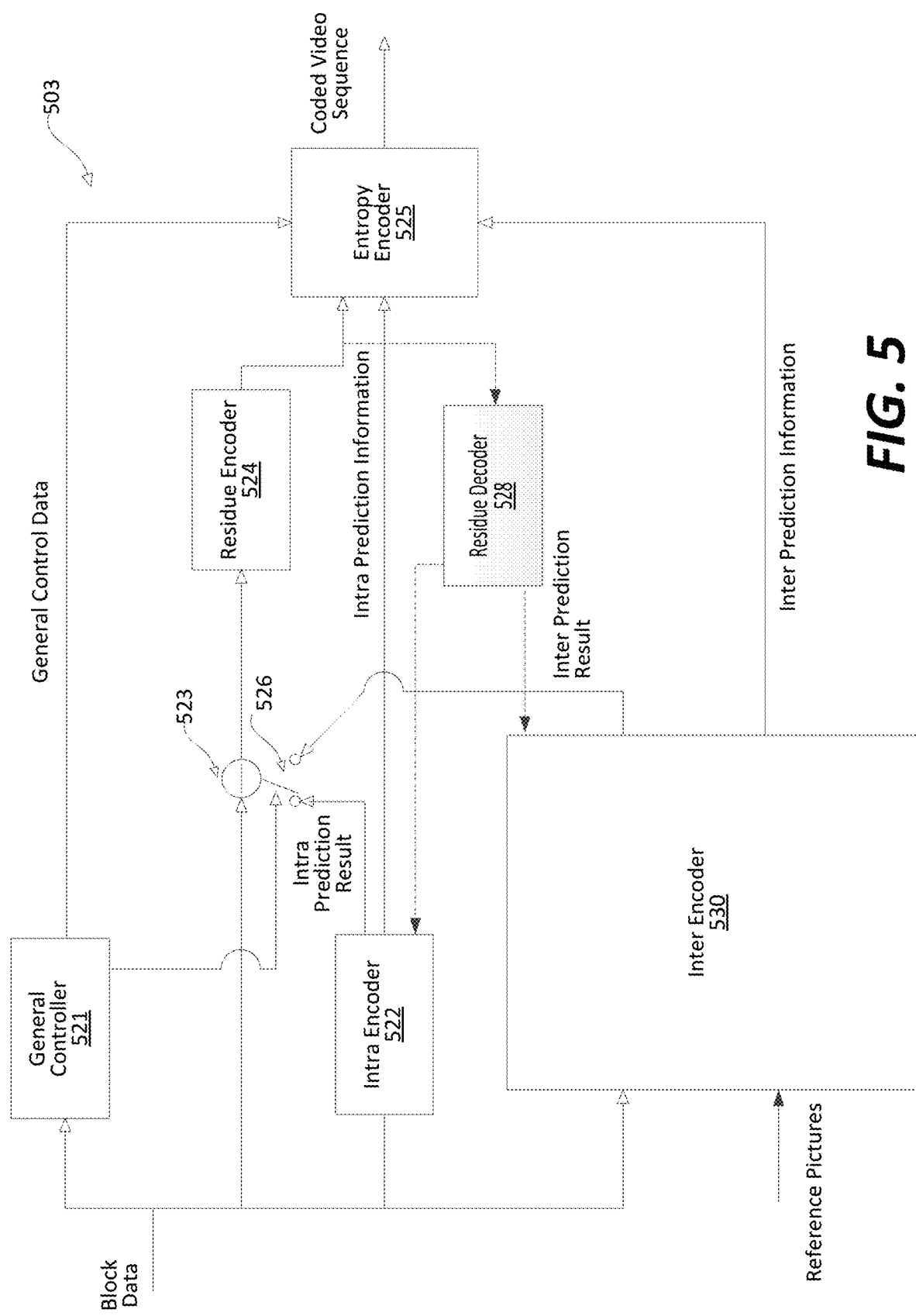
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data in the frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
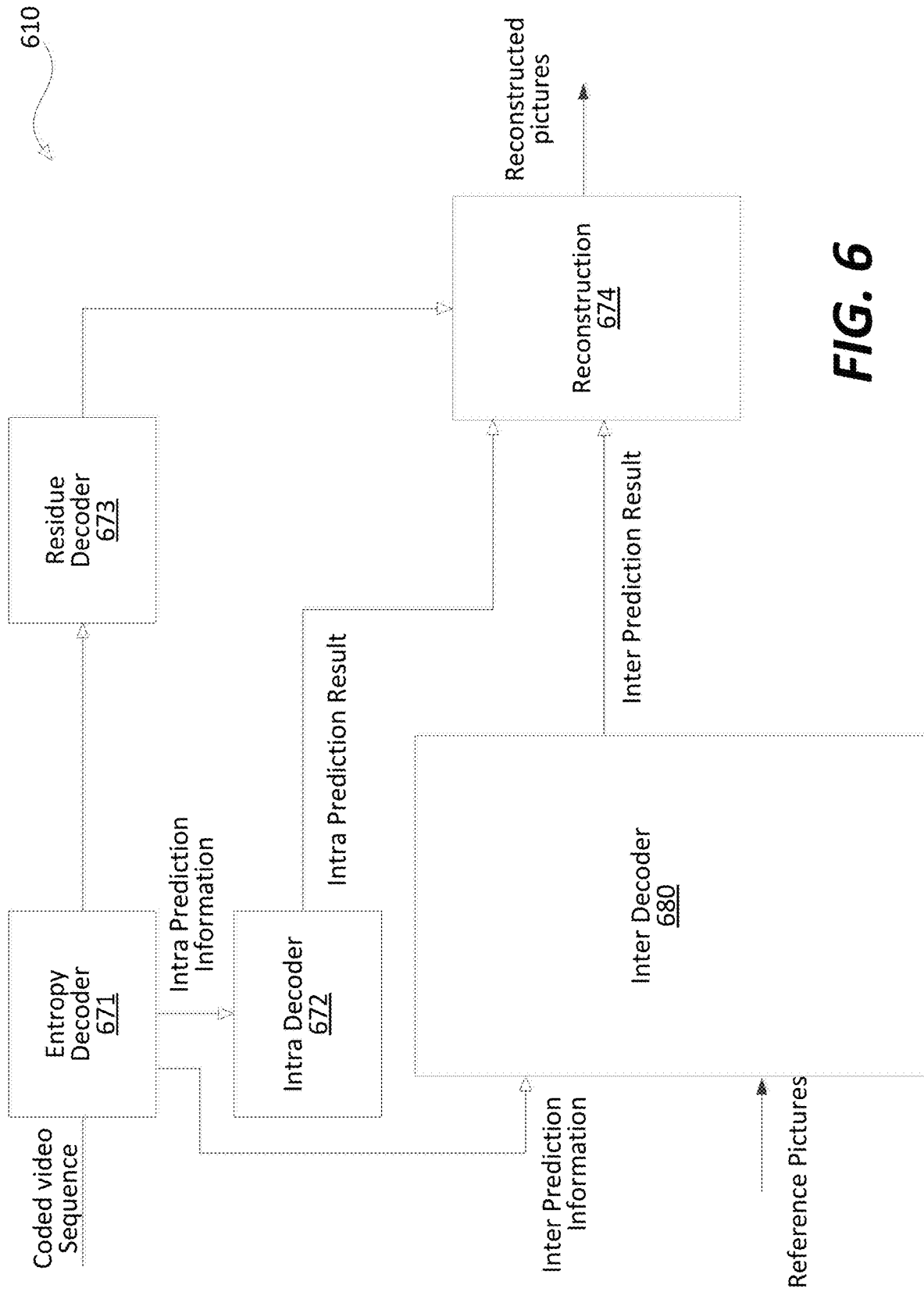
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Aspects of the disclosure provide techniques for decoder side motion vector (MV) derivation or refinement in hybrid video coding technologies. More specifically, constraints for MV derivation or refinement are provided to solve the issue that MV parsing and prefetching for the current block needs to be after the reconstruction of MV of a previous block.

Figure 7:
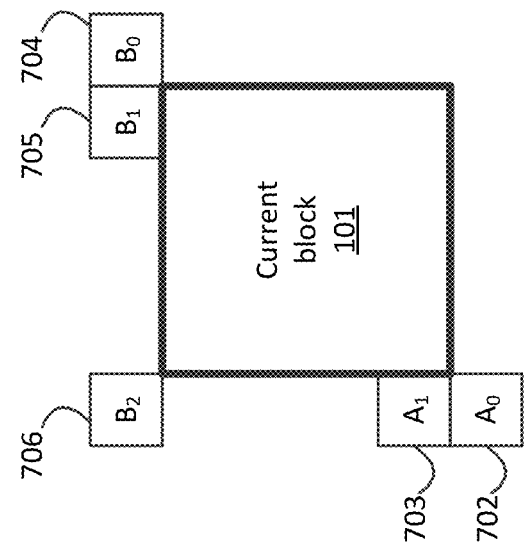
FIG. 7 is a schematic illustration of a current block and its surrounding spatial merge candidates in some examples.

Referring to FIG. 7, a current block (701) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (702 through 706, respectively). In some examples, the MV prediction can use predictors from the same reference picture that the neighboring block is using.

In some embodiments, a merge mode for inter-picture prediction is used. In an example, when a merge flag (including skip flag) is signaled as true, a merge index is then signaled to indicate which candidate in a merge candidate list is used to indicate the motion vectors of the current block. At decoder, a merge candidate list is constructed based on spatial and temporal neighbors of the current block. As shown in FIG. 7, neighboring MVs of A0, A1, and B0, B1, B2 can be added into the merge candidate list. In addition, a MV from temporal neighbors of the current block is added into the merge candidate list in an example. It is noted that additional merge candidates, such as combined bi-predictive candidates and zero motion vector candidates, and the like can be added into the merge candidate list.

In some embodiments, frame-rate up-conversion (FRUC) techniques can be used in a specific merge mode that is referred to as a FRUC merge mode. FRUC merge mode is a special merge mode based on frame-rate up conversion techniques. With the FRUC merge mode, motion information of a current block is not signaled but derived at decoder side. In the FRUC merge mode, MV of the current block is refined from several starting points which are derived from neighboring MVs.

In an example, a FRUC flag is signaled for a CU from the encoder side to the decoder side when the FRUC flag is true. When the FRUC flag is false, a merge index is signaled and the regular merge mode is used. When the FRUC flag is true, an additional FRUC mode flag is signaled to indicate which method (bilateral matching or template matching) is to be used to derive motion information for the CU.

In some examples, motion derivation process in the FRUC merge mode includes two steps. In a first step, a CU-level motion search is performed, and then in a second step, a sub-CU level motion refinement is performed. In an embodiment, at CU level, an initial motion vector is derived for the whole CU based on bilateral matching or template matching. For example, a list of MV candidates is generated and the candidate which leads to the minimum matching cost is selected as the starting point for further CU level refinement. Then, a local search based on bilateral matching or template matching around the starting point is performed and the MV result in the minimum matching cost is taken as the MV for the whole CU as the derived CU motion vector(s). Subsequently in the second step, the motion information is further refined at sub-CU level with the derived CU motion vector(s) in the first step as the starting point(s).

For example, the following derivation process is performed for a W×H CU motion information derivation, where W denotes to width of the CU, and H denotes to height of the CU. At the first stage, MV for the whole W×H CU is derived. At the second stage, the CU is further split into M×M sub-CUs. The value of M is calculated as shown in Eq. 1, where D is a predefined splitting depth which is set to 3 by default in the Joint exploration model (JEM). Then the MV for each sub-CU is derived.

$$M = \max\left\{4, \min\left(\frac{W}{2^D}, \frac{H}{2^D}\right)\right\} \quad \text{Eq. 1}$$

Figure 8:
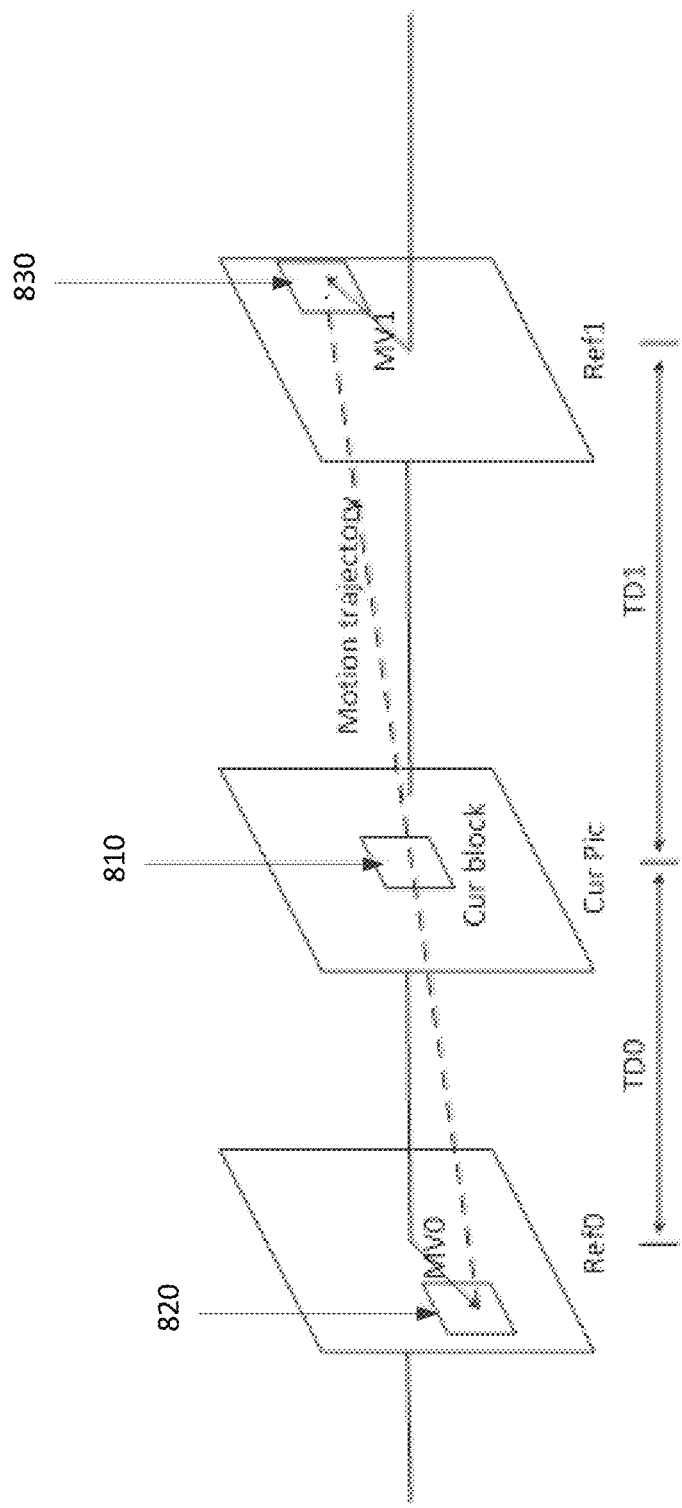
FIG. 8 shows an example of bilateral matching according to some embodiments.

FIG. 8 shows an example of bilateral matching according to some embodiments. As shown in FIG. 8, the bilateral matching is used to derive motion information of the current CU (810) (in a current picture Cur Pic) by finding the closest match between two blocks (820) and (830) along the motion trajectory of the current CU (810) in two different reference pictures (Ref0 and Ref1). Under the assumption of continuous motion trajectory, the motion vectors MV0 and MV1 pointing to the two reference blocks (820) and (830) shall be proportional to the temporal distances, i.e., TD0 and TD1, between the current picture (Cur Pic) and the two reference pictures (Ref0 and Ref1). As a special case, when the current picture is temporally between the two reference pictures and the temporal distance from the current picture (Cur Pic) to the two reference pictures (Ref0 and Ref1) is the same, the bilateral matching becomes mirror based bi-directional MV.

Figure 9:
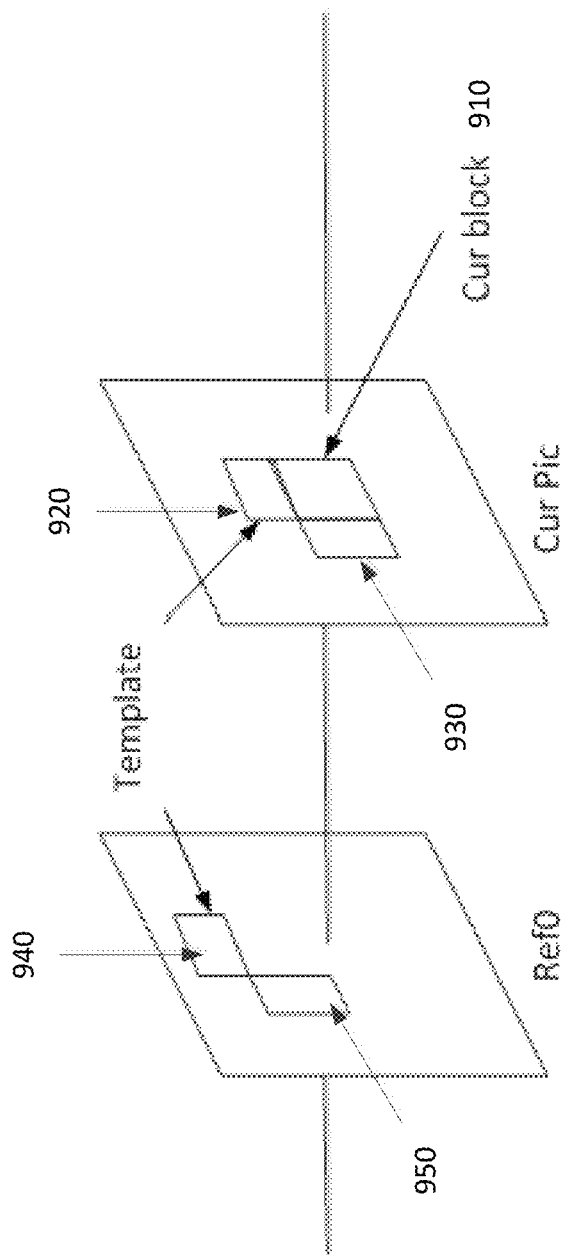
FIG. 9 shows an example of template matching according to an embodiment of the disclosure.

FIG. 9 shows an example of template matching according to an embodiment of the disclosure. As shown in FIG. 9, template matching is used to derive motion information of the current CU (910) by finding the closest match between a template (including a top and a left neighboring blocks (920) and (930) of the current CU (910)) in the current picture (Cur Pic) and blocks (940) and (950) (same shape and size as the template) in a reference picture (Ref0).

Except the aforementioned FRUC merge mode, the template matching is also applied to an advanced motion vector prediction (AMVP) mode. In the JEM and HEVC, the AMVP mode uses two candidates. In an example, the AMVP candidate list includes a first existing AMVP candidate and a second existing AMVP candidate. With template matching method, a new candidate is derived. If the newly derived candidate by the template matching is different from the first existing AMVP candidate, the newly derived candidate is inserted at the very beginning of the AMVP candidate list and then the list size is set to two (meaning the second existing AMVP candidate is removed). In an example, when the template matching is applied to AMVP mode, only CU level search is applied.

In some embodiments, when using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

In some examples, when FRUC is applied in the AMVP mode, the original AMVP candidates are also added to CU level MV candidate set. In an example, at the CU level, up to 15 MVs for AMVP CUs and up to 13 MVs for merge CUs are added to the candidate list.

In some embodiments, when a motion vector points to a fractional sample position, motion compensated interpolation is needed. In an example, to reduce complexity, bilinear interpolation instead of regular 8-tap HEVC interpolation is used for both bilateral matching and template matching.

In some embodiments, at different steps, the calculation of matching cost is different. In an example, when selecting the candidate from the candidate set at the CU level, the matching cost is calculated using the sum of the absolute difference (SAD) of bilateral matching or template matching. After the starting MV is determined, the matching cost C of bilateral matching at sub-CU level search is calculated as shown in Eq. 2:

$$C = SAD + w \cdot (|MV_x - MV_x^s| + |MV_y - MV_y^s|) \qquad \text{Eq. 2}$$

where w denotes a weighting factor which is empirically set to 4, MV and $MV^s$ denote the current MV and the starting MV, respectively. SAD is still used as the matching cost of template matching at sub-CU level search.

In some examples, in the FRUC merge mode, MV is derived by using luma samples only. The derived motion information will be used for both luma and chroma for motion compensation (MC) inter prediction. After MV is decided, final MC is performed using 8-taps interpolation filter for luma samples and 4-taps interpolation filter for chroma samples.

It is noted that MV refinement is a pattern based MV search with the criterion of bilateral matching cost or template matching cost. In some examples, two search patterns are supported, the first one is an unrestricted center-biased diamond search (UCBDS) and the second one is an adaptive cross search for MV refinement at the CU level and sub-CU level, respectively. For both CU and sub-CU level MV refinement, the MV is directly searched at quarter luma sample MV accuracy, and then followed by one-eighth luma sample MV refinement. The search range of MV refinement for the CU and sub-CU step is set equal to 8 luma samples.

According to an aspect of the disclosure, decoder side motion vector refinement (DMVR) is used to improve/refine MV based on starting points.

In some examples, in the case of bi-prediction operation, for the prediction of one block region, two prediction blocks, formed respectively using a MV0 of a first candidate list list0 and a MV1 of a second candidate list list1, are combined to form a single prediction signal that is referred to as a bilateral template. In the DMVR method, the two motion vectors MV0 and MV1 of the bi-prediction are further refined by a bilateral template matching process. The bilateral template matching applied in the decoder to perform a distortion-based search between the bilateral template and the reconstruction samples in the reference pictures to obtain a refined MV without transmission of additional motion information.

Figure 10:
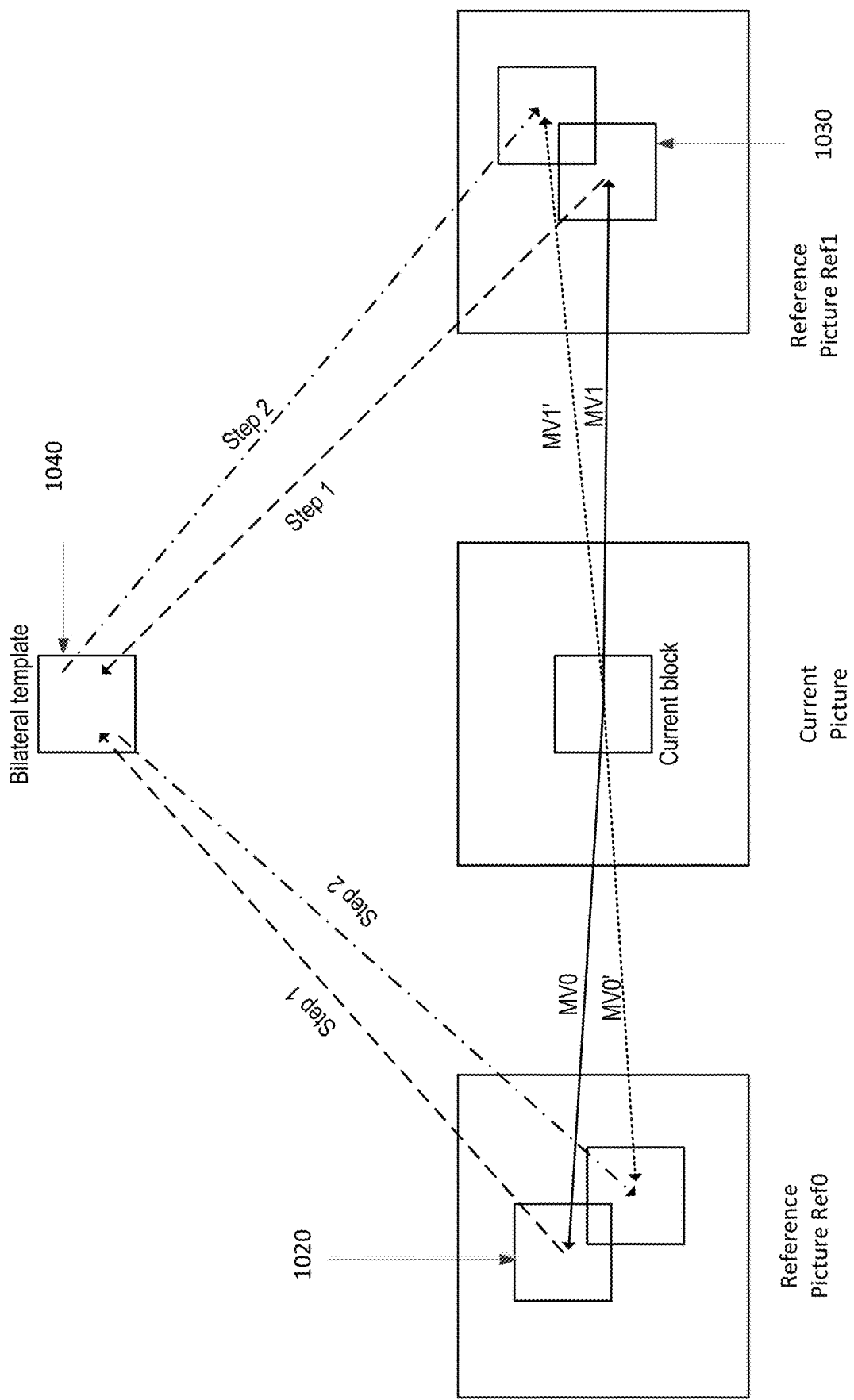
FIG. 10 shows an example of DMVR that is based on bilateral template matching.

FIG. 10 shows an example of DMVR that is based on bilateral template matching. In DMVR, the bilateral template 1040 is generated as the weighted combination (i.e. average) of the two prediction blocks 1020 and 1030, from the initial MV0 of the first candidate list list0 and MV1 of the second candidate list list1, respectively, as shown in FIG. 10. The template matching operation includes calculating cost measures between the generated template 1040 and the sample region (around the initial prediction block) in the reference pictures Ref0 and Ref1. For each of the two reference pictures Ref0 and Ref1, the MV that yields the minimum template cost is considered as the updated MV of that list to replace the original MV. For example, MV0' replaces MV0, and MV1' replaces MV1. In some examples, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 10, are used for generating the final bi-prediction results for the current block. A sum of absolute differences (SAD) can be used as the cost measure.

In some examples, DMVR is applied for the merge mode of bi-prediction with one MV from a reference picture in the past and another MV from a reference picture in the future, without the transmission of additional syntax elements.

Figure 11B:
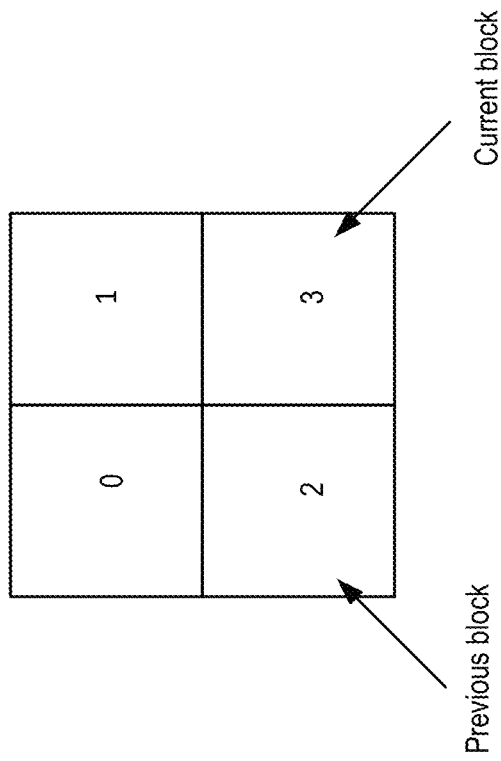
FIGS. 11A and 11B show examples of spatial relationship between a current block and its previous block.
Figure 11A:
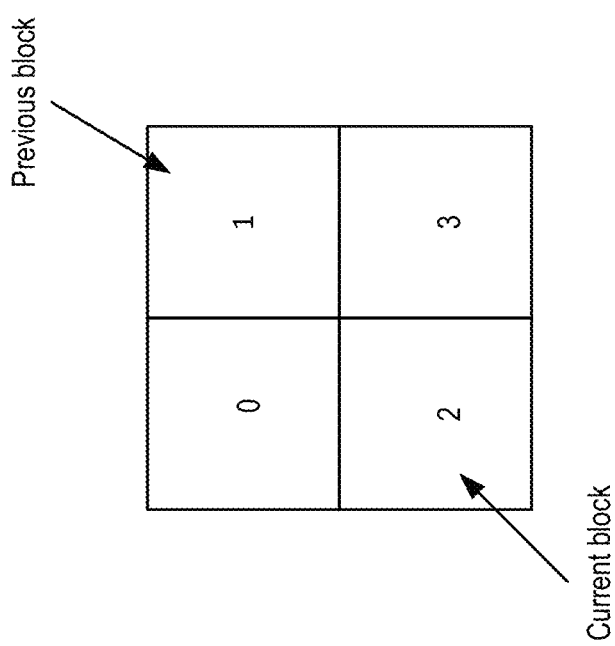

FIGS. 11A and 11B show examples of spatial relationship between a current block and its previous block with a decoding order from 0 to 3. The decoding order is known by both the encoder and the decoder. When decoding the current block, normally the MVs of its spatial neighbors will be used as predictors for decoding the MV of the current block. For example, MVs from block 0, 1, 2 are to be predictor candidates for block 3 in FIG. 11B example.

For the decoder side MV derivation (DMVD) coding tools, such as FRUC and DMVR, MVs of current block are refined/modified to improve coding efficiency. After MV refinement/modification, the MVs are written back to motion field so that the refined MVs may be used as MV predictors for later blocks. Unfortunately, this lead to difficulty in efficient architecture, such as for hardware design.

Figure 12:
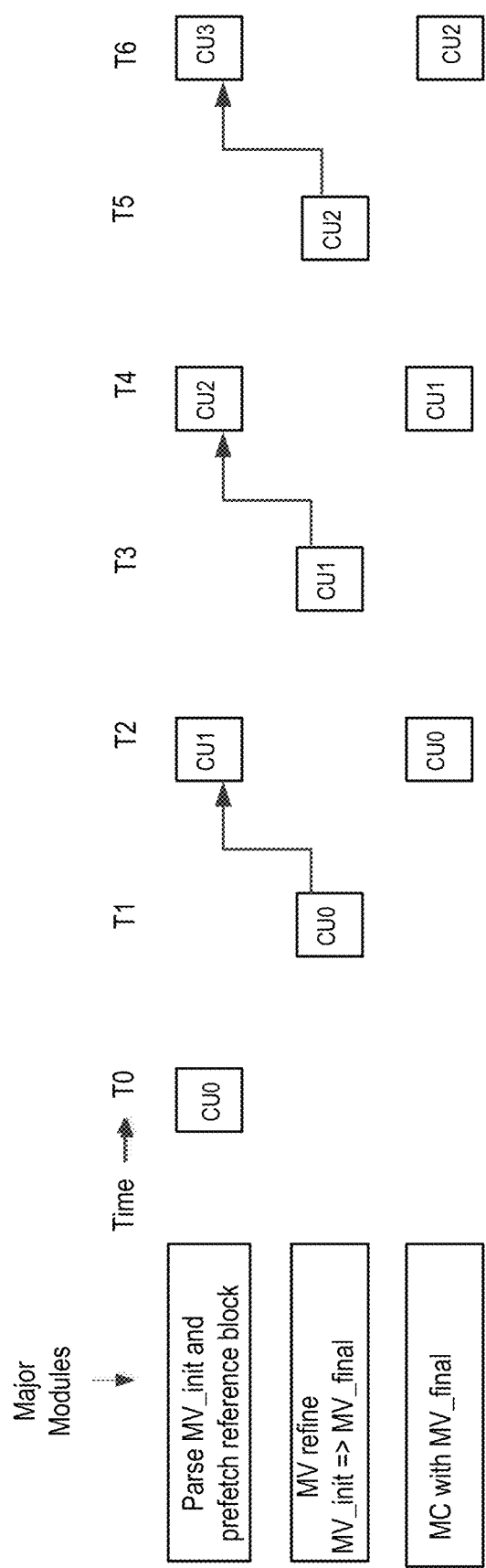
FIG. 12 shows an example of pipeline stages for video processing.

FIG. 12 shows an example of pipeline stages for DMVD methods, such as FRUC and DMVR. In the FIG. 12 example, the decoder includes three major modules. The first major module parses initial MV (MV_init) and prefetches the reference block pointed by initial MV; the second major module refines MV from the MV_init and gets the final MV (MV_final); and the third major module performs motion compensation (MC) with MV_final for the current block. In an example, the three major modules correspond to three circuit modules. In another example, the three major modules correspond to three processors executing software instructions.

In the FIG. 12 example, CU0 is processed by the three major modules at different time stages, i.e., from T0 to T2. In hardware pipeline design, it is more efficient to have each major module work at each time stage, so that, within a certain period, more CUs can be processed. However, due to the final MV of CU0 may be used as a predictor for the MV of CU1, the MV parsing and reference block prefetching of CU1 cannot be started by the first major module until MV_final of CU0 is determined in the second major module. Therefore, the parsing and prefetching module idles at T1, which further lead to the other two major modules idle in following time stages.

In the following, the term block and CU may be regarded as the same. Moreover, the previously coded block is defined as the block which is coded right before the current block. Thus, previously coded block is consecutively encoded/decoded prior to the current block in the encoding/decoding order.

Aspects of the disclosure provide techniques to exclude spatial neighbors from MV predictors when extra operations are need to finalize a motion vector deviation, such as DMVD methods, or other methods that require further modification of the MV after initial parsing stage, thus the hardware in the pipeline architecture can be more efficient used.

According to an aspect of the disclosure, the usage of the MV of a previous block as the MV predictor for the current block is constrained when DMVD methods, such as FRUC and DMVR, are used, such that the MV parsing (performed by the first major module to determine MV_init) of the current block and/or prefetching reference samples for the current CU does not need to wait until the MV refinement of the previous block (performed by the second major module) is finished. Thus, in an example, the first major module, the second major module and the third major module can operate in each time stage without waiting for results from other modules.

In some embodiments, when constructing merge candidate list or/and regular inter mode MV predictor list for the current block, an MV predictor candidate may be marked as unavailable (cannot be used as an MV predictor for the current block) when certain requirements are satisfied.

In an example, when the MV is from a block which is coded/decoded right before the current block, then the MV cannot be used as an MV predictor for the current block.

In another example, when the MV is from a block which is coded/decoded right before the current block and the previously coded/decoded block is coded in merge/skip mode, then the MV cannot be used as an MV predictor for the current block.

In another example, when the MV is from a block which is coded/decoded right before the current block, and the MV of the block may be changed after initial parsing such as by DMVD methods, then the MV cannot be used as an MV predictor for the current block. In an example, the block (previously coded/decoded right before the current block) is in merge/skip mode and has two different reference frames so that methods like FRUC and DMVR may be applied to the block, thus the block's MV may be changed after parsing. In another example, the block (previously coded/decoded right before the current block) has a non-affine bi-predicted merge mode. It is noted that normally no DMVD method is applied to a block coded with affine motion model.

In some embodiments, when non-adjacent spatial MV candidates are inserted into merge candidate list, the non-adjacent candidates are added at a grid size of the previous block size so that no non-adjacent candidate comes from a previous coded block. In another embodiment, the grid size of non-adjacent candidates is not changed. But the non-adjacent candidates which belong to the previous coded block are marked as unavailable so that they will not be added into the merge candidate list.

According to an aspect of the disclosure, when some DMVD methods (or methods that require further modification of the MV after initial parsing stage) are enabled, and some other conditions are met, some neighbors of the current block are excluded from being used for the MV prediction. For example, the MV of block 2 may not be used as predictor for block 3 in FIG. 11B.

In some embodiments, when the previously coded/decoded block (coded/decoded right before the current block) and the current block belongs two different CTUs, or two different slices, or two different tiles, the constraint can be relaxed.

In some embodiments, when the MV of a previous block is marked as unavailable for predicting the current block, a MV from one neighbor block of the previous block is used as a substitute MV predictor for the current block. When such an MV is used, such MV has been finalized at the time of the parsing of the MV of the current block. That means, such MV should be the final MV for reconstructing the said previous block's neighbor block.

It is noted that the neighbor block of the previous block can be selected by various technique. In an example, when the previous block is to the left of the current block, the MV from the said previous block's left position is used (if available). The left position can be any specified location to the left side of the said previous block. For example, the left to the top left corner of the said previous block, the left to the bottom left corner of the said previous block, etc.

In another example, when the previous block is on top of the current block, the MV from the said previous block's top position is used (if available). The top position can be any specified location to the top side of the said previous block. For example, the top to the top left corner of the said previous block, the top to the top right corner of the said previous block, etc.

In another example, regardless where the said previous block is located relative to the current block, the left position to the said previous block is used. The left position can be any specified location to the left side of the said previous block. For example, the left to the top left corner of the said previous block, the left to the bottom left corner of the said previous block, etc.

In another example, regardless where the said previous block is located relative to the current block, the top position to the said previous block is used. The top position can be any specified location to the top side of the said previous block. For example, the top to the top left corner of the said previous block, the top to the top right corner of the said previous block, etc.

In another example, when the previous block is to the left of current block, the MV from the said previous block's top position is used (if available). The top position can be any specified location to the top side of the said previous block. For example, the top to the top left corner of the said previous block, the top to the top right corner of the said previous block, etc.

In another example, the previous block is on top of current block, the MV from the said previous block's left position is used (if available). The left position can be any specified location to the left side of the said previous block. For example, the left to the top left corner of the said previous block, the left to the bottom left corner of the said previous block, etc.

In another example, instead of identifying one neighbor block of the said previous block based on the relative spatial location, a temporary motion vector is stored and updated and used as a substitute MV predictor. During the encoding and decoding, the said temporary motion vector is updated whenever a final MV (a final MV is a MV used for reconstructing a block, it can be derived either with DMVD or without DMVD) has been derived, and the value is updated to be the said final MV. When parsing the motion vector of the current block, the current value of temporary motion vector is used as a substitute MV predictor for the current block. In an embodiment, the temporary motion vector may be initialized as a default value, e.g., (0, 0) at the beginning of encoding/decoding a slice, tile, or CTU, and is updated whenever a final MV is derived. In some embodiments, multiple temporary motion vectors may be stored and updated. For the current block, one of the multiple temporary motion vectors is selected depending on coded/decoded information, including but not limited, the locations of the stored multiple temporary motion vectors, the location of the current block, the block width, height of current block, and the like.

In another example, the MV of a further previously coded block which coded right before the said previous block is used.

In another example, the MV of a further previously coded block which is coded right before the said previous block is used. And the further previously coded block is not spatially adjacent to the current block.

Figure 13:
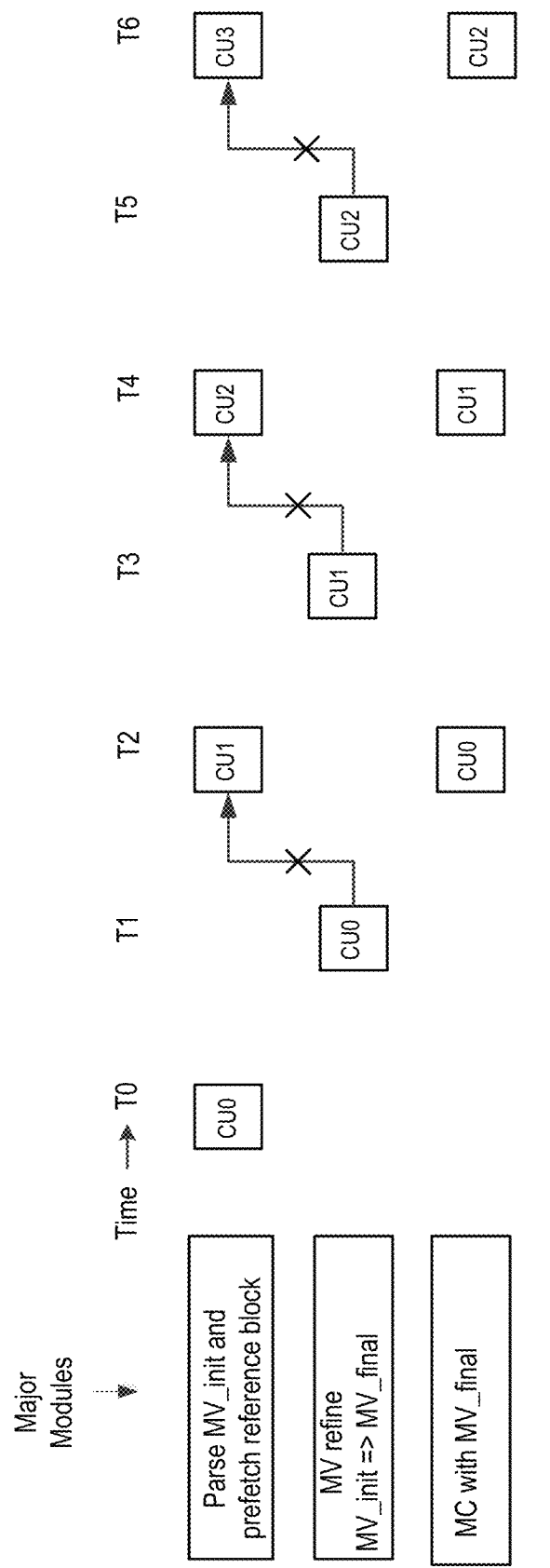
FIG. 13 shows another example of pipeline stages for video processing.

FIG. 13 shows an example of pipeline stages for DMVD methods, such as FRUC and DMVR when constrains to exclude certain spatial neighbors from MV predictors are applied. In the FIG. 13 example, the dependency of parsing MV of a CU to MV refinement of a previous CU in the encoding/decoding order is removed.

Figure 14:
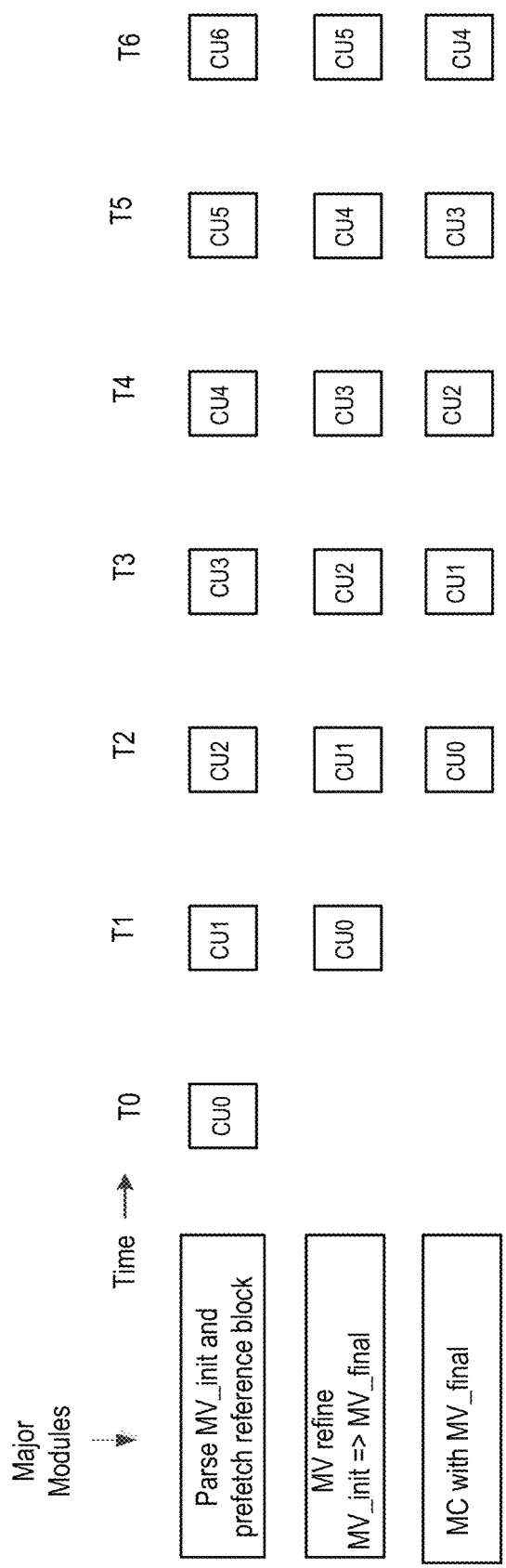
FIG. 14 shows another example of pipeline stages for video processing.

FIG. 14 shows an example of pipeline stages for DMVD methods, such as FRUC and DMVR when constrains to exclude certain spatial neighbors from MV predictors are applied, and the pipeline is optimized to improve efficiency. As shown in FIG. 14, the first major module, the second major module and the third major module operate at the same time on different CUs from time T2 to T6.

Figure 15:
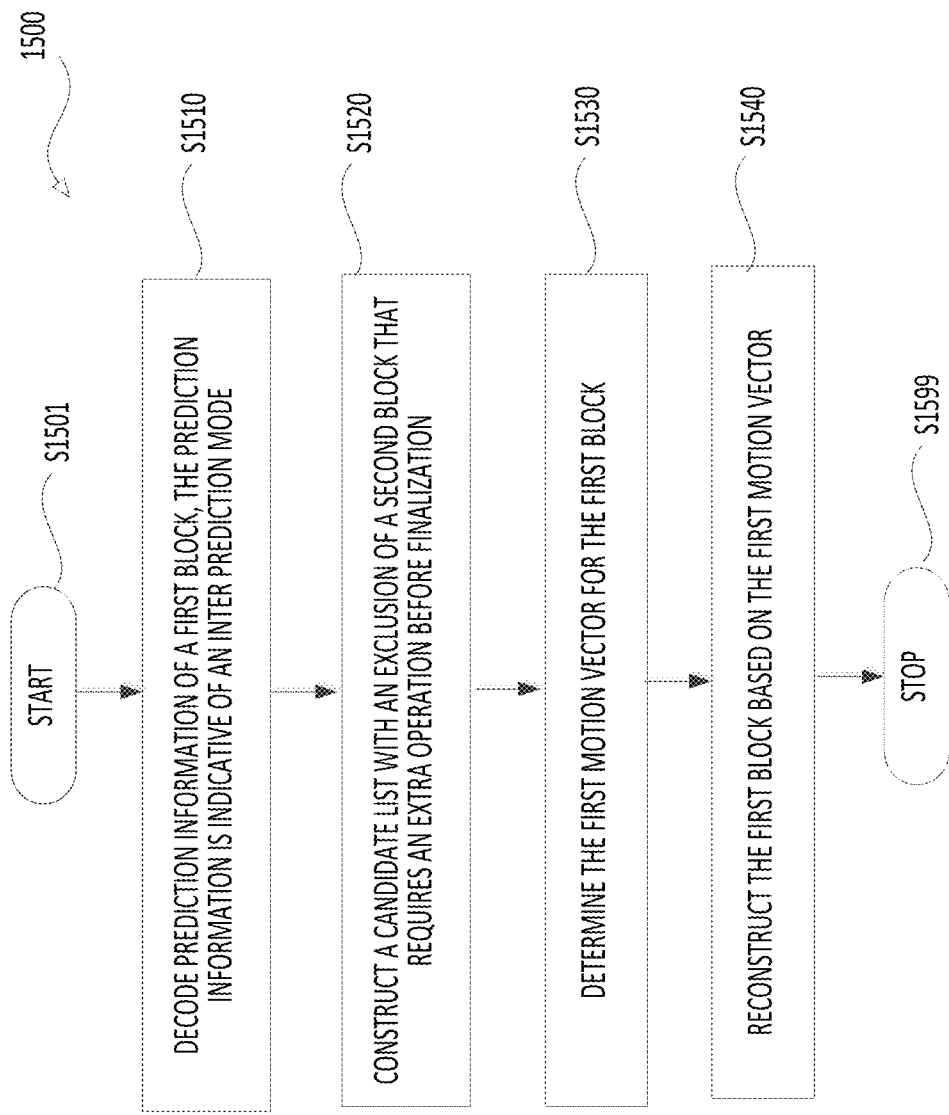
FIG. 15 shows a flow chart outlining a process according to an embodiment of the disclosure.

FIG. 15 shows a flow chart outlining a process (1500) according to an embodiment of the disclosure. The process (1500) can be used in the reconstruction of a block coded in intra mode, so to generate a prediction block for the block under reconstruction. In various embodiments, the process (1500) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the intra prediction module (352), the processing circuitry that performs functions of the video encoder (403), the processing circuitry that performs functions of the predictor (435), the processing circuitry that performs functions of the intra encoder (522), the processing circuitry that performs functions of the intra decoder (672), and the like. In some embodiments, the process (1500) is implemented in software instructions, thus when the processing circuitry executes the software instructions, the processing circuitry performs the process (1500). The process starts at (S1501) and proceeds to (S1510).

At (S1510), prediction information of a first block in a current picture is decoded from a coded video bitstream. The prediction information is indicative of an inter prediction mode, such as a merge mode, a skip mode, and the like that determines a first motion vector for the first block from a motion vector predictor.

At (S1520), a candidate list is constructed in response to the inter prediction mode. The candidate list is constructed with an exclusion from a second block that requires an operation to finalize a second motion vector in a motion vector derivation. The second motion vector is for reconstructing the second block. In some examples, a substitute motion vector is used in the candidate list in the place of the second motion vector.

At (S1530), the first motion vector is determined based on the candidate list of candidate motion vector predictors.

At (S1540), samples of the first block are reconstructed according to the first motion vector. Then, the process proceeds to (S1599) and terminates.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
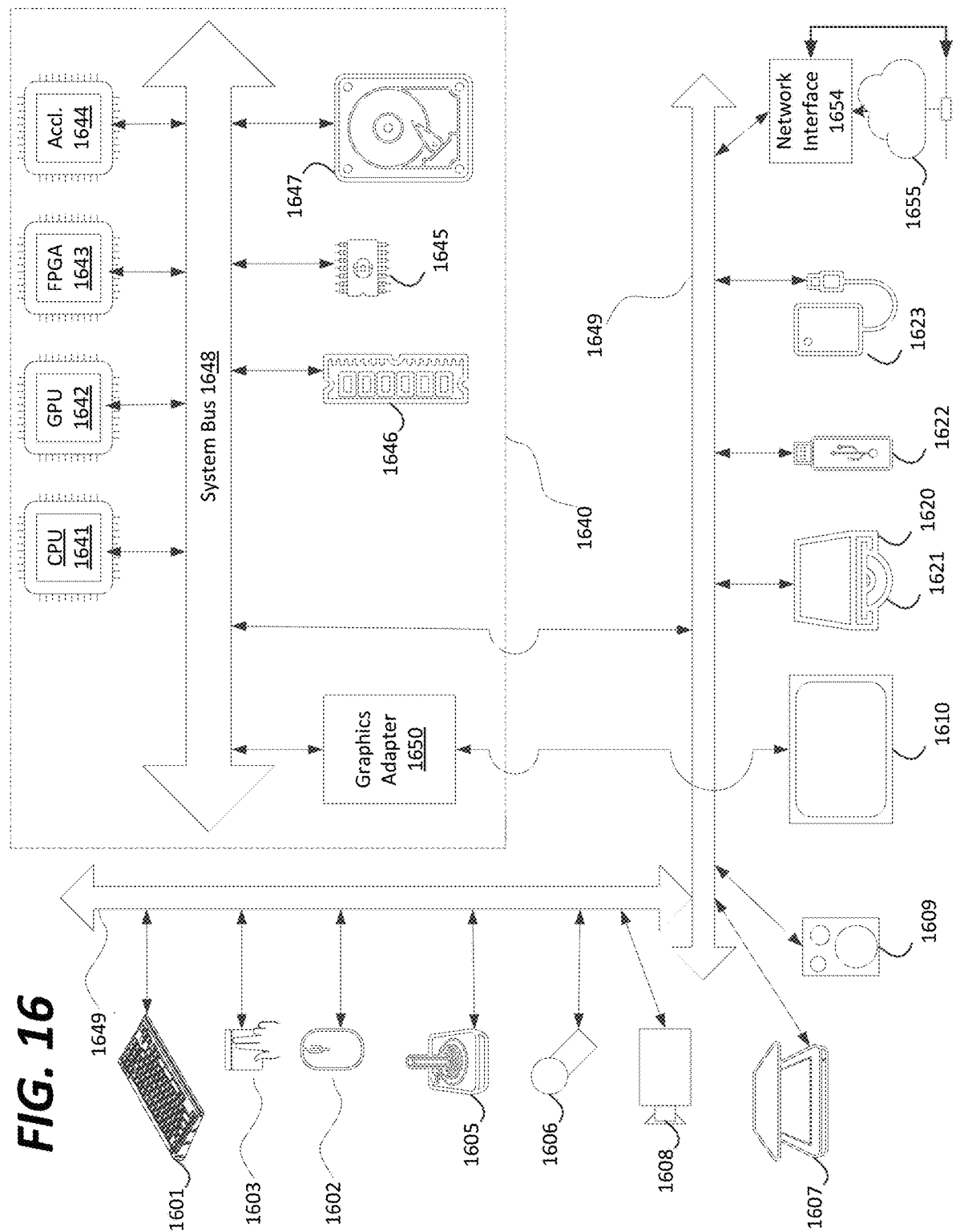
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas

What is claimed is:

1. A method for video decoding in a decoder, comprising:
determining, according to a flag signaled for a first block, whether a first motion vector, for coding the first block in a current picture that is adjacent to a second block in the current picture, is to be obtained by performing a motion vector refinement process using an initial motion vector for the first block as a starting point, the first block being consecutively prior to the second block in a decoding order;
constructing, by processing circuitry of the decoder, a list of candidate motion vector predictors according to prediction information of neighboring blocks adjacent to the second block, wherein a candidate motion vector predictor from the first block is unavailable for inclusion in the list in a case that the first motion vector is determined to be obtained by performing the motion vector refinement process;
determining, by the processing circuitry of the decoder based on the list of candidate motion vector predictors, a second motion vector for the second block; and
reconstructing the second block according to the second motion vector for the second block,
wherein the method further comprises:
identifying the initial motion vector by a first processing stage implemented by the processing circuitry of the decoder;
deriving the first motion vector based on the initial motion vector by a second processing stage implemented by the processing circuitry of the decoder; and
reconstructing the first block according to the first motion vector by a third processing stage implemented by the processing circuitry of the decoder, and
wherein, while the constructing the list of candidate motion vector predictors is performed by the first processing stage, the deriving the first motion vector based on the initial motion vector is performed by the second processing stage.

2. The method of claim 1, wherein
the candidate motion vector predictor from the first block is available for inclusion in the list when the first block and the second block are included in different coding tree units, different slices, or different tiles.

3. The method of claim 1, wherein:
the candidate motion vector predictor from the first block is unavailable for inclusion in the list in a case that the first block is coded according to one of a merge mode and a skip mode.

4. The method of claim 1, wherein
the candidate motion vector predictor from the first block is unavailable for inclusion in the list in a case that the first block is coded according to a bi-lateral prediction mode.

5. The method of claim 1, wherein
a candidate motion vector predictor from a third block is used as a substitute of the candidate motion vector predictor from the first block in a case that the candidate motion vector predictor from the first block is unavailable for inclusion in the list, the third block being adjacent to the first block and prior to the first block in the decoding order.

6. The method of claim 1, further comprising:
determining the first motion vector is to be obtained by performing the motion vector refinement process in a case that the first block is coded according to one of a decoder side motion vector refinement mode and a frame-rate up-conversion mode.

7. An apparatus for video decoding, comprising:
processing circuitry configured to:
determine, according to a flag signaled for a first block, whether a first motion vector, for coding the first block in a current picture that is adjacent to a second block in the current picture, is to be obtained by performing a motion vector refinement process using an initial motion vector for the first block as a starting point, the first block being consecutively prior to the second block in a decoding order;
construct a list of candidate motion vector predictors according to prediction information of neighboring blocks adjacent to the second block, wherein a candidate motion vector predictor from the first block is unavailable for inclusion in the list in a case that the first motion vector is determined to be obtained by performing the motion vector refinement process;
determine, based on the list of candidate motion vector predictors, a second motion vector for the second block; and
reconstruct the second block according to the second motion vector for the second block,
wherein the processing circuitry is further configured to perform:
identifying the initial motion vector by a first processing stage implemented by the processing circuitry;
deriving the first motion vector based on the initial motion vector by a second processing stage implemented by the processing circuitry; and
reconstructing the first block according to the first motion vector by a third processing stage implemented by the processing circuitry, and
wherein, while the constructing the list of candidate motion vector predictors is performed by the first processing stage, the deriving the first motion vector based on the initial motion vector is performed by the second processing stage.

8. The apparatus of claim 7, wherein
the candidate motion vector predictor from the first block is available for inclusion in the list when the first block and the second block are different coding tree units, different slices, or different tiles.

9. The apparatus of claim 7, wherein
the candidate motion vector predictor from the first block is unavailable for inclusion in the list in a case that the first block is coded according to one of a merge mode and a skip mode.

10. The apparatus of claim 7, wherein
the candidate motion vector predictor from the first block is unavailable for inclusion in the list in a case that the first block is coded according to a bi-lateral prediction mode.

11. The apparatus of claim 7, wherein
a candidate motion vector predictor from a third block is used as a substitute of the candidate motion vector predictor from the first block in a case that the candidate motion vector predictor from the first block is unavailable for inclusion in the list, the third block being adjacent to the first block and prior to the first block in the decoding order.

12. The apparatus of claim 7, wherein processing circuitry is further configured to:
determine the first motion vector is to be obtained by performing the motion vector refinement process in a case that the first block is coded according to one of a decoder side motion vector refinement mode and a frame-rate up-conversion mode.

13. A non-transitory computer-readable medium storing instructions which when executed by a computer for video decoding cause the computer to perform:
determining, according to a flag signaled for a first block, whether a first motion vector, for coding the first block in a current picture that is adjacent to a second block in the current picture, is to be obtained by performing a motion vector refinement process using an initial motion vector for the first block as a starting point, the first block being consecutively prior to the second block in a decoding order;
constructing a list of candidate motion vector predictors according to prediction information of neighboring blocks adjacent to the second block, wherein a candidate motion vector predictor from the first block is unavailable for inclusion in the list in a case that the first motion vector is determined to be obtained by performing the motion vector refinement process;
determining, based on the list of candidate motion vector predictors, a second motion vector for the second block; and
reconstructing the second block according to the second motion vector for the second block,
wherein the instructions when executed by the computer for video decoding further cause the computer to perform:
identifying the initial motion vector by a first processing stage implemented by the computer executing the instructions;
deriving the first motion vector based on the initial motion vector by a second processing stage implemented by the computer executing the instructions; and
reconstructing the first block according to the first motion vector by a third processing stage implemented by the computer executing the instructions, and
wherein, while the constructing the list of candidate motion vector predictors is performed by the first processing stage, the deriving the first motion vector based on the initial motion vector is performed by the second processing stage.

14. The non-transitory computer-readable medium of claim 13, wherein
the candidate motion vector predictor from the first block is available for inclusion in the list when the first block and the second block are included in different coding tree units, different slices, or different tiles.

15. The non-transitory computer-readable medium of claim 13, wherein the instructions when executed by the computer for video decoding further cause the computer to perform:
determining the first motion vector is to be obtained by performing the motion vector refinement process in a case that the first block is coded according to one of a decoder side motion vector refinement mode and a frame-rate up-conversion mode.

16. The non-transitory computer-readable medium of claim 13, wherein
a candidate motion vector predictor from a third block is used as a substitute of the candidate motion vector predictor from the first block in a case that the candidate motion vector predictor from the first block is unavailable for inclusion in the list, the third block being adjacent to the first block and prior to the first block in the decoding order.

* * * * *